United States Patent [19]

Harp

[11] Patent Number: 5,044,866

[45] Date of Patent: *Sep. 3, 1991

[54] CONTAINERIZING AND DECONTAINERIZING A LOAD

[75] Inventor: James J. Harp, Annandale, Va.

[73] Assignee: Commodity Handling Systems, Inc., Woodbridge, Va.

[*] Notice: The portion of the term of this patent subsequent to May 23, 2006 has been disclaimed.

[21] Appl. No.: 271,422

[22] Filed: Nov. 15, 1988

Related U.S. Application Data

[60] Continuation of Ser. No. 83,201, Aug. 10, 1987, Pat. No. 4,833,560, Division of Ser. No. 83,201, Aug. 10, 1987, Pat. No. 4,833,560, and a continuation-in-part of Ser. No. 42,815, Apr. 27, 1987.

[51] Int. Cl.⁵ ............... B60P 1/64; B65D 88/12; B65G 67/02
[52] U.S. Cl. ............... 414/495; 180/125; 206/355; 280/43.12; 410/26; 414/341; 414/347; 414/498
[58] Field of Search ............... 414/495, 498, 664, 341, 414/391–393, 347; 180/125; 280/43.12; 254/93 HP, 2 R, 2 B; 211/13; 410/3, 4, 7, 13, 24, 26; 206/355

[56] References Cited

U.S. PATENT DOCUMENTS

| | | | |
|---|---|---|---|
| 2,524,260 | 10/1950 | Hutson | 206/335 X |
| 3,178,216 | 5/1961 | Huber | 206/335 X |
| 3,204,580 | 9/1965 | Spense et al. | 410/13 |
| 3,209,929 | 10/1965 | Peterson et al. | 180/125 X |
| 3,620,388 | 11/1971 | Mansson | 410/3 X |
| 3,667,635 | 6/1972 | Hackney | 414/498 |
| 3,831,708 | 8/1974 | Terry | 180/125 X |
| 4,124,119 | 11/1978 | Nordstrom | 410/13 X |
| 4,240,773 | 12/1980 | Terry | 180/125 X |
| 4,488,612 | 12/1984 | Patterson | 254/2 R X |
| 4,751,883 | 6/1988 | Beater | 410/24 X |
| 4,797,049 | 1/1989 | Gearin et al. | 414/498 X |
| 4,801,229 | 1/1989 | Hanada et al. | 410/26 |
| 4,832,560 | 5/1989 | Harp | 414/495 |

FOREIGN PATENT DOCUMENTS

| | | | |
|---|---|---|---|
| 519689 | 10/1957 | Italy | 410/26 |
| 967798 | 8/1964 | United Kingdom | 410/26 |

OTHER PUBLICATIONS

"Air Bearing Transporter for Containerized Cargo", Videotape, produced by Civil Engineering Lab, Naval Construction Batallion Center, Point Hueneme, CA.

Primary Examiner—David A. Bucci
Attorney, Agent, or Firm—Nixon & Vanderhye

[57] ABSTRACT

Load-lifting apparatus includes a pair of elements moveable on air bearings laterally toward and away from one another. Each element carries an inflatable bladder for lifting a load. A rack is also provided for receiving various loads, for example, automotive vehicles. The elements have cutouts at longitudinally spaced positions such that, upon disposition of the elements below the rack, the elements can be moved laterally away from one another with the cutouts registering with the wheel wells. The bladders may be inflated to lift the rack and load carried thereby for movement into a container. The process may be reversed to remove the rack and load from the container.

14 Claims, 4 Drawing Sheets

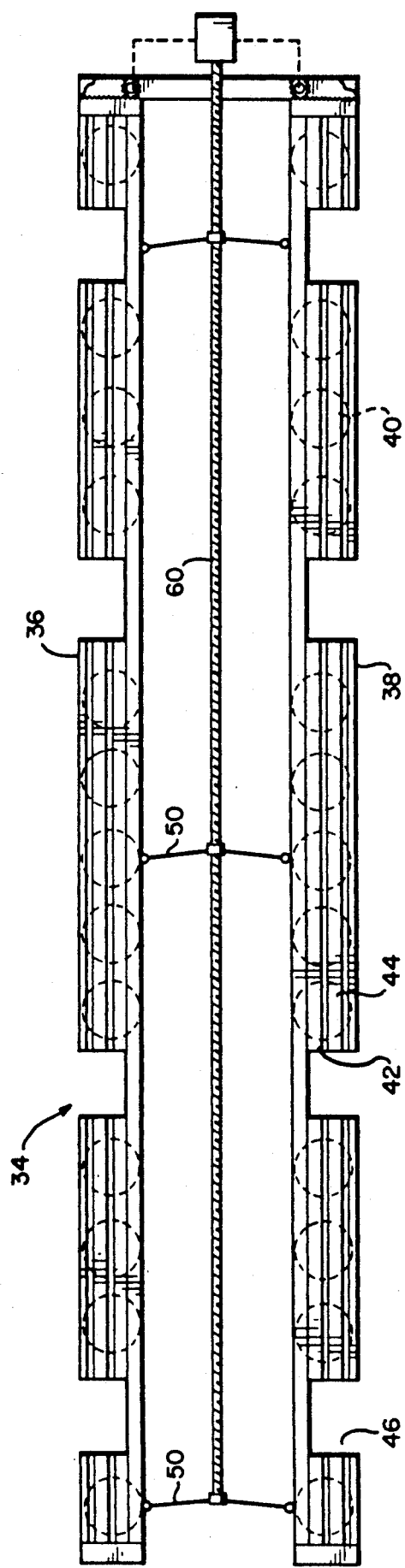
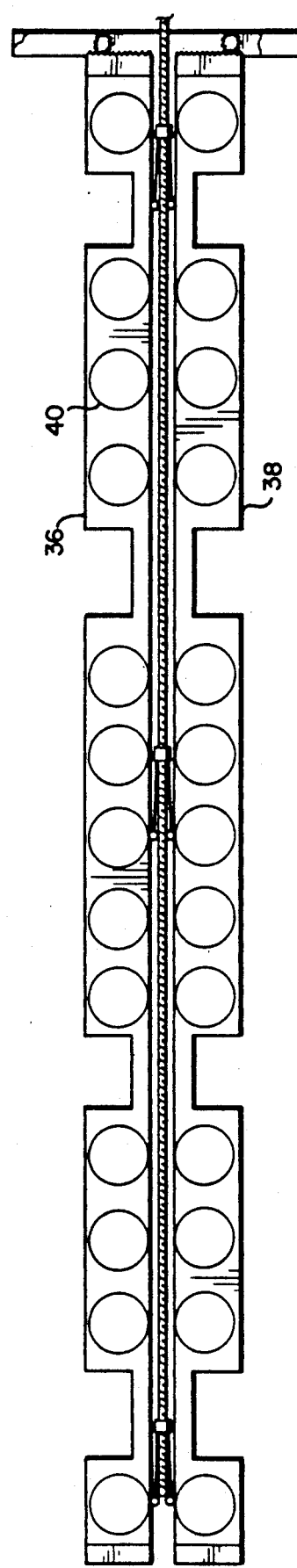
FIG. 3
FIG. 4

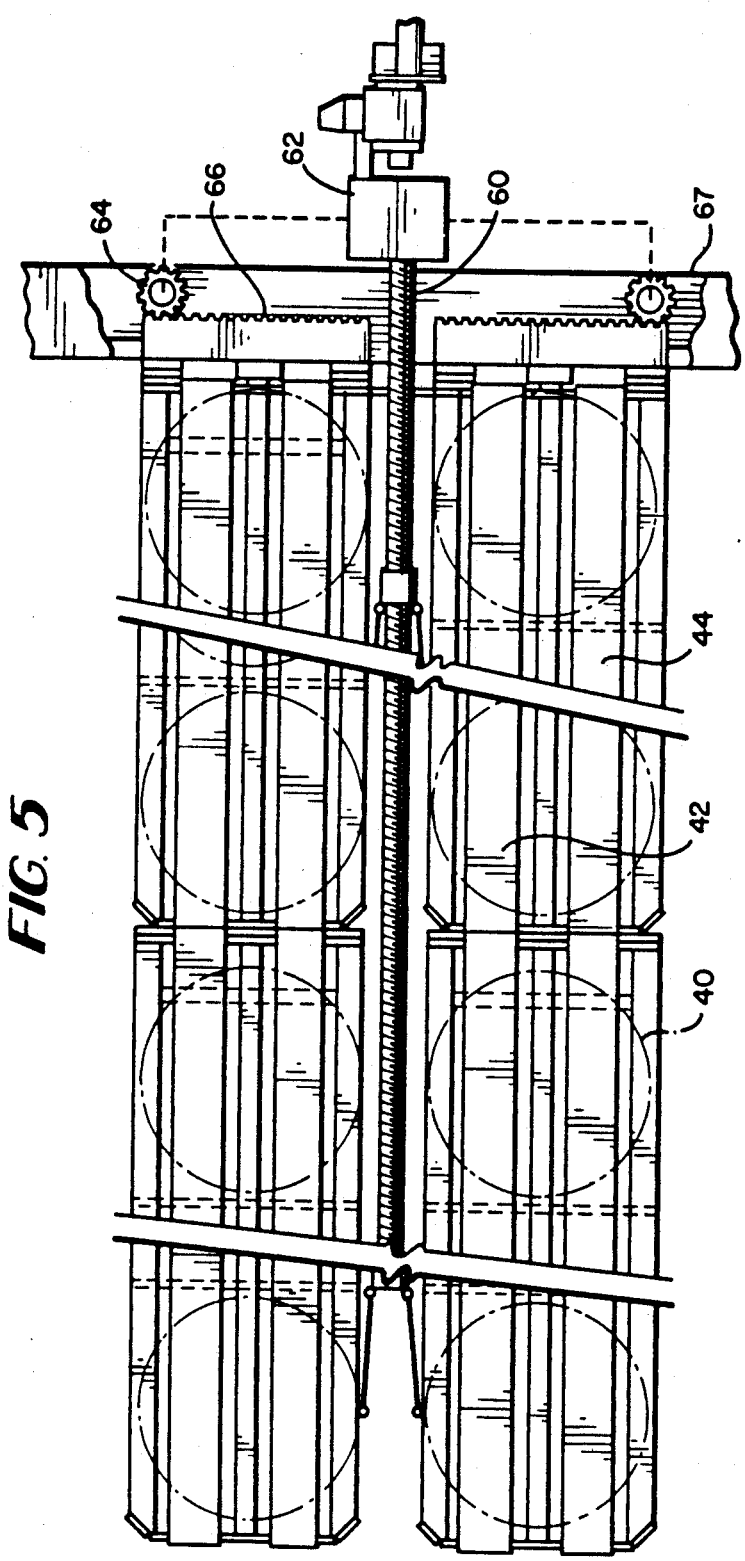
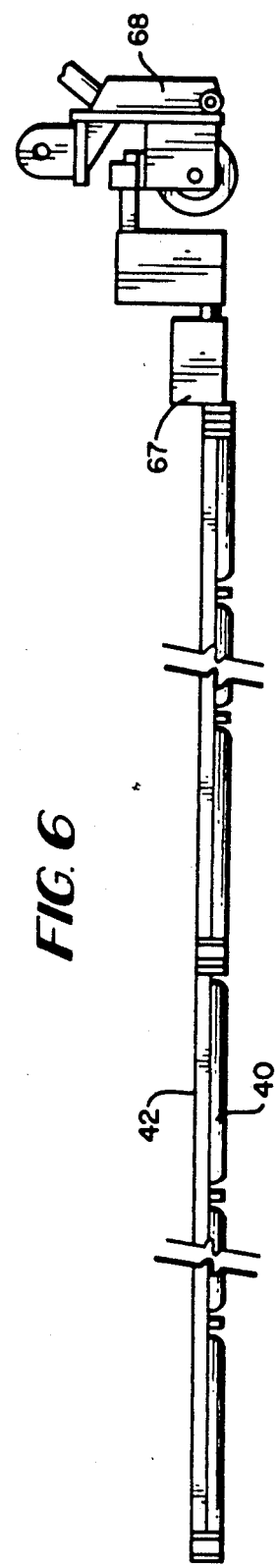
FIG. 5
FIG. 6

CONTAINERIZING AND DECONTAINERIZING A LOAD

RELATED APPLICATIONS

This application is a continuation/divisional of application Ser. No. 07/083,201 filed Aug. 10, 1987, now U.S. Pat. No. 4,832,560, and also is a continuation-in-part of prior application Ser. No. 07/042,815, filed Apr. 27, 1987.

BACKGROUND AND SUMMARY OF THE INVENTION

The present invention relates to apparatus and methods for containerizing and de-containerizing loads, particularly automotive vehicles, wherein the loads are disposed on racks for disposition in and transport with the container. More particularly, the present invention relates to apparatus and methods for lifting loads disposed on a load-bearing rack for movement into and out of containers, as well as to the rack and container combination.

In the overseas, as well as overland, long-distance transportation of products, it has been desirable for many years to transport goods in transport containers. Transport containers conventionally are in 20-feet and 40-feet sizes and a wide variety of goods can be transported by such containers. However, one class of goods, i.e., automotive vehicles, have yet to be efficiently and effectively containerized for transport. Most overseas transport of automotive vehicles requires the vehicles to be driven onto and off the ship. While on board, the vehicles are normally tied down for the duration of the trip but are otherwise frequently exposed to the surrounding environment. Where open racks are used, for example, in overland transportation, the vehicles are driven onto and off of the racks. It will be appreciated from the foregoing that the vehicles, in both cases, are individually moved a substantial number of times between the start and end of the trip and throughout the trip are exposed to the surrounding environment. The potential for damage to the goods, e.g., dents, glass and plastic breakage, etc. is enormous and, unfortunately, often realized. Also, the exposure to environmental conditions, for example, salt, in the overseas transport of vehicles, can be ruinous to the vehicle finish and other parts. Vehicles are often coated with various substances to avoid this type of deterioration of the finish and destruction of other parts. This involves, however, expenditure of substantial time, labor and materials, thereby incurring still additional expense.

According to the present invention, apparatus and methods are provided for containerizing and de-containerizing a load, for example, automotive vehicles, whereby the individual goods comprising the load may be transported within the container fully protected from the surrounding environment and without the need for any movement of individual loads or vehicles from start to finish of the trip. Further, the present invention provides apparatus and methods for loading and unloading the load relative to the container in such manner that the load may be readily and easily containerized and de-containerized. Additionally, because of the nature of the apparatus for loading and unloading, as well as the rack for supporting and confining the goods within the container, substantial savings in overall space, including head space, are realized.

To accomplish the foregoing and in accordance with the principles of the present invention, there is provided a rack for supporting the load in the container and on which rack the load may be transported to and from the container. While the rack hereof is described particularly with respect to the transport of automotive vehicles, it will be appreciated that loads other than vehicles may be carried by the rack. The rack comprises an open framework formed generally of a series of horizontal and vertical tubular members having along its lower side a pair of ramps which extend the full length of the rack, for example, a length in excess of the length necessary to hold two vehicles in end-to-end or tandem relation. Pairs of ramps are superposed over the lower ramps for holding an additional one or two vehicles, the ramps are connected to the structural support for the rack through slip joints whereby the ramps may be adjusted in elevation and location along the longitudinal extent of the rack. In accordance with the present invention, the ramps have wheel wells which project below the elevation of the ramps for receiving the wheels of the vehicles. The lower ramps per se are spaced above the underlying load-bearing surface to enable disposition of a lift apparatus between the surface and the rack, although the wheel wells of the lower ramps may extend substantially to the lowermost portions of the rack. The wheel wells are also provided on the elevated pairs of ramps. Thus, it will be appreciated that vehicles, with the use of auxiliary ramps, may be driven into position on the rack with the wheels of the vehicles situated in the wheel wells of the ramps. Once in position on the rack, the vehicles may be tied down in a conventional manner.

The apparatus for loading and unloading the loaded rack relative to the container includes a pair of side-by-side elongated elements having along their undersurfaces a plurality of air bearings. Upon inflation, the air bearings enable the lift to ride on the air bearings and, hence, be displaced. On each of the elements there is provided an inflatable bladder for lifting the load. Consequently, when the elements are disposed beneath the load, the bladder may be inflated to lift the load and the load may therefore be transported by the lift.

In a preferred form hereof, the elements are connected one to the other for movement toward and away from one another. Additionally, cutouts are formed along the outer edges of each of the elements. When, for example, the lift is disposed below the rack, the elements are closely spaced one to the other and inserted into a central longitudinal portion of the rack. A mechanism is provided to displace the elements laterally away from one another with the wheel wells registering with the cutouts. In this manner, the overall height of the rack may be reduced without sacrificing the ability to lift the rack with its load. Once the elements are disposed below the ramp portions of the rack, the bladders may be inflated and the rack lifted. It will be appreciated that once the rack is lifted, it may be disposed in the container by movement of the lift, together with the rack and its load on the air bearings or the rack and its load may be removed from the container.

With the foregoing described apparatus and methods, the load may be disposed on the rack and the rack disposed in a container which may then be sealed. The container may be loaded onto the ship or train or truck, as applicable, and transported to its destination. At the destination, the lift may be used to remove the rack from the container. It will be appreciated that in all such transport of the load, the individual items constituting the load are not moved from the rack or relative to one another, thereby avoiding the potential for damage to the loads.

Accordingly, and in accordance with a preferred embodiment of the present invention, there is provided an assembly for lifting a load comprised of first and second elongated support elements in side-by-side relation one to the other. Air bearing means are disposed along the underside of each of the elements and include connections for receiving air under pressure whereby the elements are displaceable for movement under a load. An inflatable member is carried by each of the elements and has connections for receiving air under pressure whereby, upon inflation, the load may be lifted. Means are provided to interconnect the elements one to the other for movement toward and away from one another, together with means for moving the elements toward and away from one another. In a preferred embodiment, at least two pairs of pivoted links interconnect the elements one to the other at longitudinally spaced positions along the length of the lift and the links are connected one to the other and moveable to displace the links between extended positions for moving the elements into a first position spaced one from the other for lifting the load and collapsed positions for moving the elements into a second non-load lifting position. Preferably, the elements have cutouts at longitudinally spaced positions therealong for receiving the wheel wells formed on the rack when the elements are displaced away from one another into load-bearing position under the ramps.

In a further preferred aspect of the present invention, there is provided a method for containerizing a load including the steps of disposing the load on a rack, moving a transportable lift into position below the rack, inflating the inflatable bladder carried by the lift for lifting the rack and the load carried thereby, inflating a plurality of elements carried by the lift and forming an air bearing for the lift, moving the lift, rack and load carried thereby on the air bearings into a container, deflating the bladder for placing the rack and the load carried thereby on the container and removing the lift from beneath the rack and from the container.

The present invention also encompasses a method for de-containerizing a load disposed on the rack within the container onto a load-bearing surface. Such method comprises the steps of moving a transportable lift into the container into a position below the rack, inflating an inflatable bladder carried by the lift into engagement with the rack and elevating the rack and the load carried thereby relative to the container, inflating a plurality of elements carried by the lift and thereby forming an air bearing for the lift, moving the lift, rack and load carried thereby on the air bearings from the container and onto the load-bearing surface, deflating the bladder for placing the rack and the load carried thereby on the load-bearing surface and withdrawing the lift from beneath the rack and load.

In a preferred embodiment of the method of containerizing and de-containerizing, the load comprises automotive vehicles and the rack has wells in which the wheels of the vehicles are disposed, together with cutouts provided in the members for receiving the wheels. The method is further characterized by the steps of moving the members in a lateral direction away from one another to locate them in position for lifting the rack and the load carried thereby, with the wheels received into the cutouts in the members, inflating the bladder on each member for lifting the rack and the load carried thereby, deflating the bladders for placing the rack and the load carried thereby in the container when containerizing and onto the load-bearing surface when de-containerizing and moving the members toward one another to facilitate withdrawal of the lift from beneath the rack and the load.

Accordingly, it is a primary object of the present invention to provide novel and improved apparatus and methods for containerizing and de-containerizing a load, specifically automotive vehicles, as well as apparatus and methods for facilitating lifting of the rack and load carried thereby into and out of the container.

These and further objects and advantages of the present invention will become more apparent to the following specification, appended claims and drawings.

BRIEF DESCRIPTION OF THE DRAWING FIGURES

FIG. 3 is a plan view of a lift constructed in accordance with the present invention and illustrating the lift in its laterally extended lifting position;

FIG. 4 is a view similar to FIG. 3, with the bladders removed, illustrating the location of the air bearings, as well as the elements in a collapsed condition;

FIG. 5 is an enlarged fragmentary plan view of the lift showing portions of the header;

FIG. 6 is a side elevational view thereof;

DETAILED DESCRIPTION OF THE DRAWING FIGURES

Reference will now be made in detail to the present preferred embodiment of the invention, an example of which is illustrated in the accompanying drawings.

Figure 1:
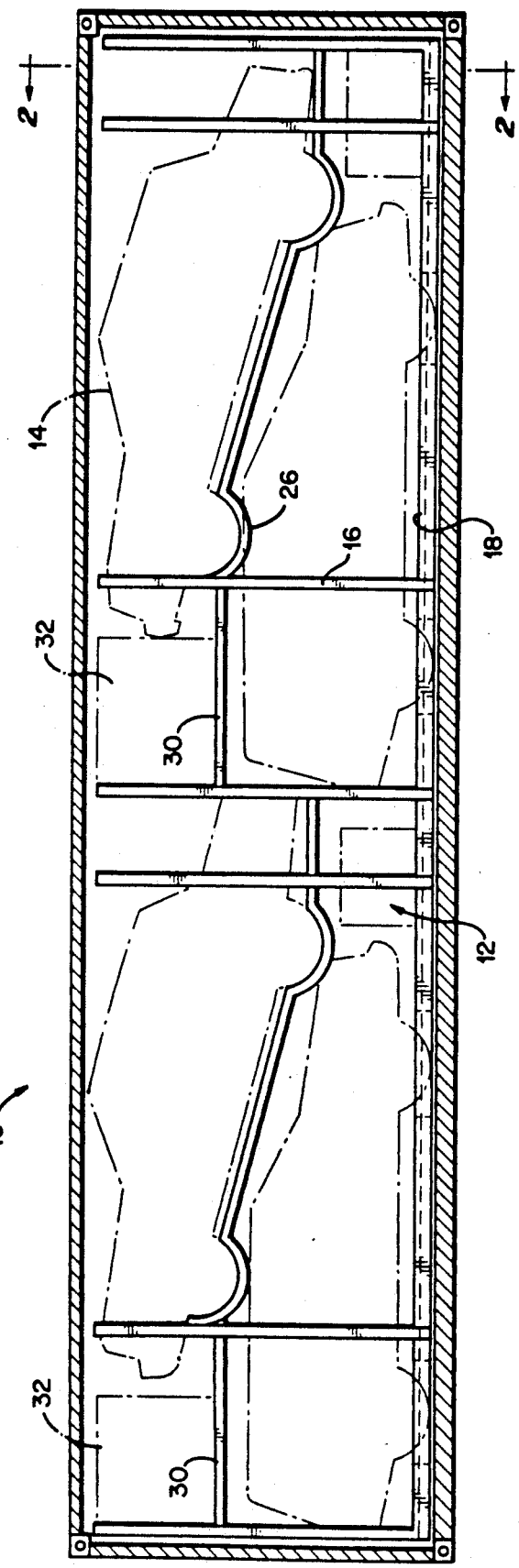
FIG. 1 is a longitudinal cross-sectional view through a container illustrating a rack bearing a load, for example, a plurality of automotive vehicles, in accordance with the present invention.
Figure 2:
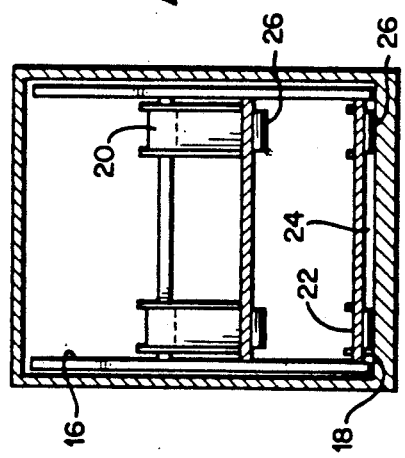
FIG. 2 is a cross-sectional view thereof taken about on line 2—2 in FIG. 1.

Referring now to FIGS. 1 and 2, there is illustrated a container, generally designated 10, for housing a rack, generally designated 12, which, in turn, bears the load, in the illustrated form, constituting a plurality of automobiles indicated by the dashed lines 14. Container 10 may be formed of any suitable construction, for example, having sheet metal side, top, bottom and end walls, with suitable reinforcing, not shown, whereby the rack and the load carried thereby may be wholly encapsulated. It will be appreciated that the container may be of any dimension desired, but is usually formed, for example, in 20- or 40-foot lengths and would be sufficiently wide to accommodate the width of an automotive vehicle. Any length or width that conforms to ISO standards could be employed.

The rack 12 is comprised of a plurality of upstanding and horizontal tubular members 16 and 18, respectively, interconnected to form a rigid structure, the upstanding tubular members 16 being disposed along the side of the rack 12. Load-bearing surfaces, for example, pairs of ramps 20, are provided for interconnection with and support by the vertical members 16 at positions elevated from a pair of bottom ramps 22. The upper ramps 20 are secured to the vertical tubular structural support member 16 by means of slip joints, not shown, whereby the ramps 20 may be disposed at various elevations and configurations within the rack 12. The ramps constituting the pairs of ramps 20 and 22 are respectively laterally spaced one from the other a distance to support the wheels of the automotive vehicles 14. The lower ramps 22 are elevated above the lower edge of the rack sufficiently to receive the lift, as explained hereinafter, whereby a space 24 is provided centrally of the rack throughout its longitudinal extent.

In accordance with the present invention and to reduce the overall elevation of the rack and, hence, the size of the container, wheel wells 26 are provided on each of the pairs of ramps 20 and 22. Thus, when automotive vehicles are driven onto the ramps, the wheels of the vehicles will reside in the wells 26 during transport. Additional ramps may be provided as space allows, for example, at 30 in FIG. 1, where additional loads 32 may be carried. Thus, the rack 12 constitutes a rigid support structure for the loads having an area 24 centrally of the rack for receiving a lift whereby the rack may be lifted and moved into and out of the container.

Referring now to FIGS. 3 and 4, the lift according to the present invention, is generally designated 34 and includes first and second elements or fingers 36 and 38 constructed of a substantially relatively rigid material, such as steel. A plurality of air bearings 40 are provided along the undersurface of each of the elements 36 and 38. The air bearings may be obtained from Air Float Corporation of Decatur, Illinois or other suppliers. Each bearing has a lift capacity of about 8,000 pounds. Air under pressure is supplied to the bearings at about 4 p.s.i. and the air flow is typically about 16 cubic feet per minute per bearing, although it can be as low as 8 ft.$^3$/minute and still function. If desired, check valves may be incorporated in the bearings in order to provide greater stability for maneuverability and shifting loads and flotation on less than smooth surfaces. Each element 36 and 38 has on its top surface at least one load bar and preferably a pair of inflatable load bars 42 and 44. The load bars are formed preferably of wear-resistance material. Details of the manner in which air is provided both the load bars and the air bearing is set forth in co-pending U.S. Pat. Application Ser. No. 042,815, filed Apr. 27, 1987, the disclosure of which is incorporated herein by reference. Additionally, each of the elements 36 and 38 is provided at longitudinally spaced positions therealong with a plurality of cutouts 46. The spacing of the cutouts 46 longitudinally relative to one another is such to accommodate the longitudinal spacing between the wheels of the vehicles intended to be carried by the rack 12. Because the vehicles have different wheel bases, the cutouts 46 are lengthened somewhat to accommodate the different wheel bases of different types of vehicles.

Figure 7:
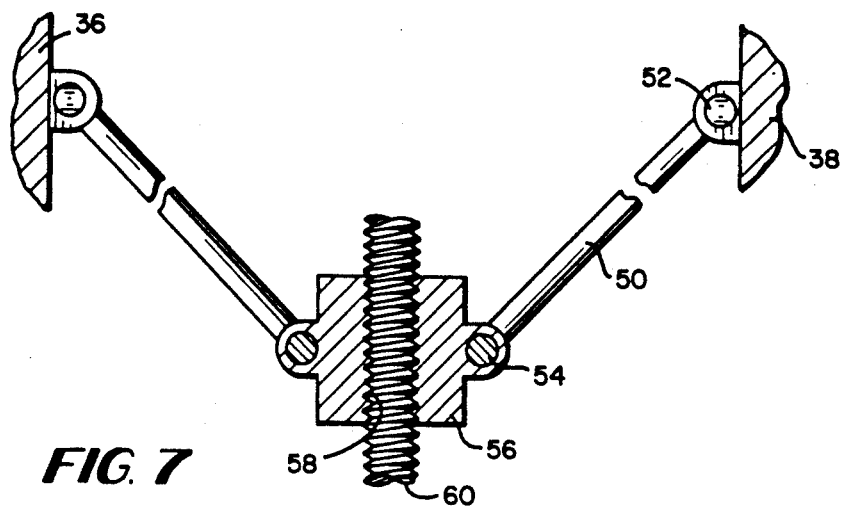
FIG. 7 is an enlarged fragmentary plan view illustrating the linkage between the elements and the apparatus for displacing the elements toward and away from one another.
Figure 8:
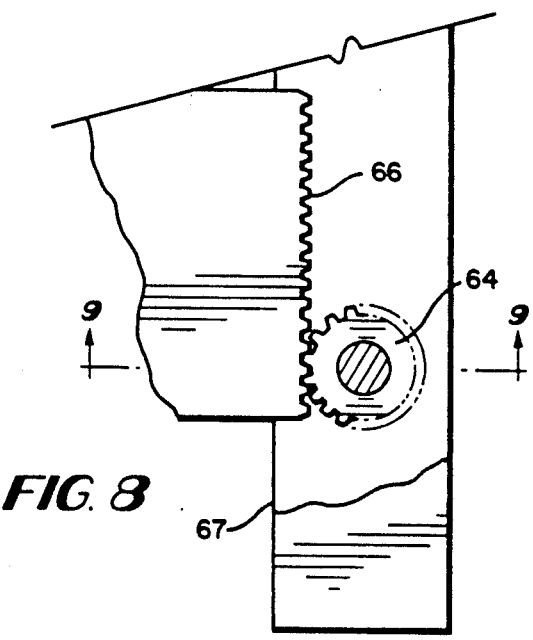
FIG. 8 is a fragmentary enlarged plan view of the header and its connection with one element.
Figure 9:
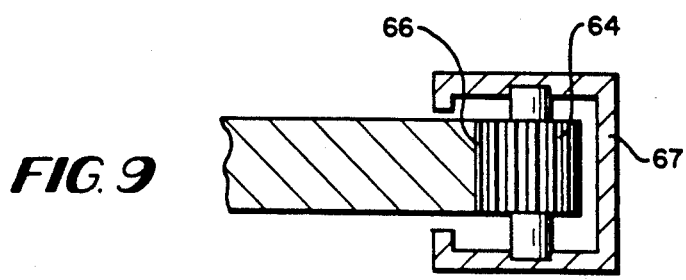
FIG. 9 is a cross-sectional view thereof taken generally about one line 9—9 in FIG. 8.

As can be seen from a review of FIGS. 3 and 4, the elements 36 and 38 are moveable toward and away from one another in a lateral direction between an expanded position illustrated in FIG. 3 and a collapsed position illustrated in FIG. 4. The elements 36 and 38 are connected laterally on to the other by a means of a plurality of links 50 disposed at longitudinally spaced positions along the lift 34. Each pair of links 50 is pivotally connected, as illustrated in FIG. 7, at their outer ends at 52 to the corresponding elements 36 or 38 and at their inner ends at 54 to a traveling nut 56. The traveling nut 56 has a central internally threaded bore 58 for receiving an elongated screw 60 which extends longitudinally the length of the lift 34. As illustrated in FIG. 5, the forward end of the screw 60 is disposed in a drive mechanism 62, the details of which are not shown. Suffice to say, that the drive mechanism 62 may comprise an air or electric motor for rotating the screw 60 about its axis while retaining it in its longitudinal position. Also, the drive mechanism 62 may have suitable drive connections with gears 64 carried in the header, 67 at one end of the lift 34. The gears 64 lie in engagement with gear racks 66 along the forward ends of the elements 36 and 38. Consequently, it will be appreciated that upon actuation of the drive mechanism 62, the thread 60 is rotated to displace the traveling nuts 56 toward or away from the header 67. By displacing the nuts forwardly, the inner ends of the links 50 are advanced toward the header, thereby displacing the elements 36, 38 inwardly toward one another. Rotation of the shaft 60 in the opposite direction displaces the traveling nuts 56 away from header 67, thereby displacing the elements 36 and 38 away from one another. Simultaneously, the drive mechanism 62 drives the pinions 64 which drive the gear rack 66, thereby facilitating movement of the forward ends of the elements 36 and 38 in a similar and corresponding movement, as caused by the screw and traveling nuts 60 and 56, respectively.

As illustrated in FIGS. 5 and 6, connected to the header 67 may be a commercially available powered hand truck, also known as a tractor, indicated 68. Preferably, the hand truck 68 includes an inflatable bladder, not shown, which is used to facilitate transfer of a portion of the load from the elements 36 and 38 to the hand truck. The interconnection between the hand truck and header 67 is such as to accommodate the vertical displacement of the elements 36 and 38, while retaining traction at truck 68 for movement of the lift 34.

With the foregoing construction, it will be appreciated that the elements 36 and 38 may be elevated on the air bearings and moved about by the tractor 68. Additionally, the bladders 42 and 44, when disposed under the load, may be inflated to lift the load up whereby the load and lift ride on the air bearings and are moveable by operation of tractor 68.

In using the apparatus hereof, it will be appreciated that the rack 12 may be loaded, for example, with the vehicles 14, by using suitable auxiliary ramps such that the vehicles 14 are supported by the pairs of ramps 20 and 22, with the wheels thereof in wheel wells 26. Additional cargo or load, such as indicated at 32, may also be provided rack 12. When fully loaded, lift 34 in the collapsed condition illustrated in FIG. 4, may be moved about on its air bearing support by tractor 68. Particularly, the lift elements 36 and 38 may be disposed endwise into one end of rack 12 below the ramps 22. The rack 12 is supported along its side edges, leaving the central portion of the rack elevated above the load-bearing surface. Thus, the lift 34 may be inserted into the central portion of the rack. When the cutouts 46 lie in lateral registry with the wells 26 of the lower ramps 22, the screw thread 60 and pinions 64 are activated such that the elements 36 and 38 move laterally away from one another. In this manner, the cutouts receive the wheel wells 26 and the elements 36 and 38 lie below the respective ramps 22. To lift the rack with its load, the bladders 42 and 44 are inflated whereby the load and rack are both supported by lift 34 on the air bearings. The tractor 68 is then operated to dispose the rack and its load into container 10, preferably through an open end thereof. Once in the container, as illustrated in FIG. 1, and with the elements 36 and 38 disposed in the space 24 below the ramps 22 but above the lower wall of the container, the bladders 42 and 44 are deflated. By deflating the bladders, the rack and the load carried thereby is disposed on the lower wall of the container. With the rack and load removed from the lift elements 36 and 38, the mechanism 62 is actuated to drive the screw 60 and pinions 64 in a manner to move the elements 36 and 38 laterally toward one another until such time as the elements 36 and 38 longitudinally clear the wheel wells 26. Once clear, the tractor 68 is backed away from the container and the elements withdrawn from the space 24 below the rack and load.

Once the containerized cargo reaches its destination, a similar lift 34 may be used to de-containerize or unload the rack and load from the container 10. To accomplish this, air is supplied the air bearings and the tractor 68 is moved such that the elements 36 and 38 may be disposed within the central portion of the container in the space 24 (FIG. 2) below the rack and load. The screw 60 and pinions 64 are actuated to displace the elements 36 and 38 away from one another whereby the cutouts 46 register with the wells 26 and the elements 36 and 38 register below the ramps 22. Once in registration, the bladders 42 and 44 are inflated to lift the rack and load carried thereby from the container. Once lifted, the tractor 68 backs off, withdrawing the rack and load carried thereby from container 10. The tractor then moves the lift with the rack and load carried thereby to the desired location. The bladders 42 and 44 are then deflated such that the rack, and the load carried thereby, rests on the load-bearing surface. When the load is thus removed from the elements 36 and 38, the tractor withdraws the elements 36 and 38 from below the rack.

When the container 10 is emptied of vehicles, it can be shipped back to the country of origin with other cargo. For example, the container could be filled with logs, supported by (e.g., chained or lashed to) the rack 12.

It will be appreciated that the objects of the present invention are fully accomplished in that there has been provided novel and unique apparatus and methods for containerizing and de-containerizing loads, for example, automotive vehicles, in a manner wherein the vehicles are not subject to damage during transport and are fully encapsulated within a container. Moreover, there has been provided apparatus for facilitating movement of the rack with the load, i.e., automotive vehicles, into and out of the container in a manner which minimizes the space required for the rack within the container. The potential for damage to the load is also minimized or eliminated, and the container can be shipped back filled with other goods (e.g., with logs).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly for lifting a load comprising:
   first and second elongated support elements in side-by-side relation one to the other;
   air-bearing means disposed along the underside of each of said elements, including connections for receiving air under pressure whereby said elements are displaceable for movement under a load;
   an inflatable member carried by each of said elements, including connections for receiving air under pressure whereby, upon inflation, the load may be lifted;
   means interconnecting said elements one to the other for movement toward and away from one another; and
   means for moving said elements toward and away from one another;
   said assembly in combination with a rack for supporting the load, said rack including a plurality of interconnected longitudinally and laterally and upright extending structural elements for supporting the load thereon, means carried by said rack for supporting portions of said rack at elevated positions for supporting a load thereon above the rest of the rack, and most other portions of the rack above ground level sufficiently to enable movement of said air bearing means underneath said rack portions, with said inflatable members in an un-inflated condition so that upon inflation thereof, said support elements with air bearing means lift said rack with the load thereon.

2. An assembly according to claim 1 wherein said interconnecting means includes at least two pairs of pivoted links interconnecting said elements one to the other at longitudinally spaced positions therealong and said moving means includes means connecting said pairs of links and being movable to displace said pairs of links between extended positions for moving said elements into a first position spaced one from the other for lifting the load and collapsed positions for moving said elements into a second non-load lifting position.

3. An assembly according to claim 2 wherein said connecting means includes an elongated bar connected to said links at the pivot juncture of each said pair thereof.

4. An assembly according to claim 1 wherein said rack is specifically configured for the transport of automotive vehicles and includes a pair of laterally spaced ramps for receiving the vehicles.

5. An assembly according to claim 1 wherein said elements have cutouts at longitudinally spaced positions therealong for receiving portions of the load.

6. An assembly according to claim 4 wherein each of said ramps includes a pair of longitudinally spaced wheel wells for receiving the wheels of the vehicles thereby reducing the overall height of the vehicle in transport on the rack, said elements having cutouts at longitudinally spaced positions therealong for receiving the wheels of the vehicles.

7. An assembly according to claim 6 wherein said rack and said ramps carried thereby extend longitudinally a distance sufficient to transport two automotive vehicles one behind the other on said ramps, a second pair of ramps elevated above the first-mentioned pair for carrying at least one additional auto vehicle in superposed relation above at least a portion of the vehicle carried by the first-mentioned ramps.

8. An assembly as recited in claim 1 wherein said means for interconnecting said elements one to the other for movement toward and away from one another, and means for moving said elements toward and away from one another comprise gear racks formed at one end of each of said first and second elongated support elements, and pinions rotatable about vertical axes operatively engaging said gear racks.

9. An assembly as recited in claim 8 wherein said means for interconnecting said elements one to the other and means for moving said elements toward and away from one another further comprise a center element disposed between said support elements, and reciprocal in the dimension of elongation of said support elements; and a pair of links, each link pivotally mounted at one end thereof to said central element and pivotally mounted at the other element thereof to one of said support elements so that upon reciprocation of said central element said support elements move toward and away from each other.

10. An assembly as recited in claim 1 wherein said means for interconnecting said elements one to the other and means for moving said elements toward and away from one another comprise a center element disposed between said support elements, and reciprocal in the dimension of elongated of said support elements; and a pair of links, each link pivotally mounted at one end thereof to said central element and pivotally mounted at the other element thereof to one of said support elements so that upon reciprocation of said central element said support elements move toward and away from each other.

11. An assembly according to claim 4 wherein said elements have cutouts at longitudinally spaced positions therealong for receiving portions of the load.

12. A rack distinct from other structures and transportable by itself and with its supported load, and for supporting a plurality of automotive vehicles, comprising:

a plurality of interconnected longitudinally, vertically and laterally extending structural elements carrying pairs of laterally spaced ramps for supporting the vehicles thereon;

means carried by said rack including said vertically extending elements for supporting at least a first pair of ramps at an elevated position above ground level and disposed at least in part over a second pair of ramps;

a third pair of ramps carried by said rack and extending longitudinally a distance relative to said first pair of ramps sufficient to dispose two automotive vehicles one behind the other on said first and third pairs of ramps;

said rack, with supported vehicles, dimensioned to fit into a standard overseas transport type container with at least three automotive vehicles supported thereby; and wherein certain of said longitudinal elements provides additional storage space for loads distinct from said vehicles, including horizontally extending platforms disposed above said second pair of ramps; and wherein wheel wells extend below the associated ramps such that the underside of the vehicle lies closer to the ramps than otherwise in the absence of said wheel wells.

13. An assembly for lifting a load comprising:

first and second elongated support elements in side-by-side relation one to the other;

air-bearing means disposed along the underside of each of said elements, including connections for receiving air under pressure whereby said elements are displaceable for movement under a load;

an inflatable member carried by each of said elements, including connections for receiving air under pressure whereby, upon inflation, the load may be lifted;

means interconnecting said elements one to the other for movement toward and away from one another; and means for moving said elements toward and away from one another;

wherein said means for interconnecting said elements one to the other for movement toward and away from one another, and means for moving said elements toward and away from one another, comprise gear racks formed at one end of each of said first and second elongated support elements, and pinions rotatable about vertical axes operatively engaging said gear racks.

14. An assembly as recited in claim 13 wherein said means for interconnecting said elements one to the other and means for moving said elements toward and away from one another further comprise a center element disposed between said support elements, and reciprocal in the dimension of elongation of said support elements; and a pair of links, each link pivotally mounted at one end thereof to said central element and pivotally mounted at the other element thereof to one of said support elements so that upon reciprocation of said central element said support elements move toward and away from each other.

* * * * *